May 8, 1928.
R. P. DUNMIRE
CONDUIT FITTING
Filed Oct. 30, 1925
1,669,190
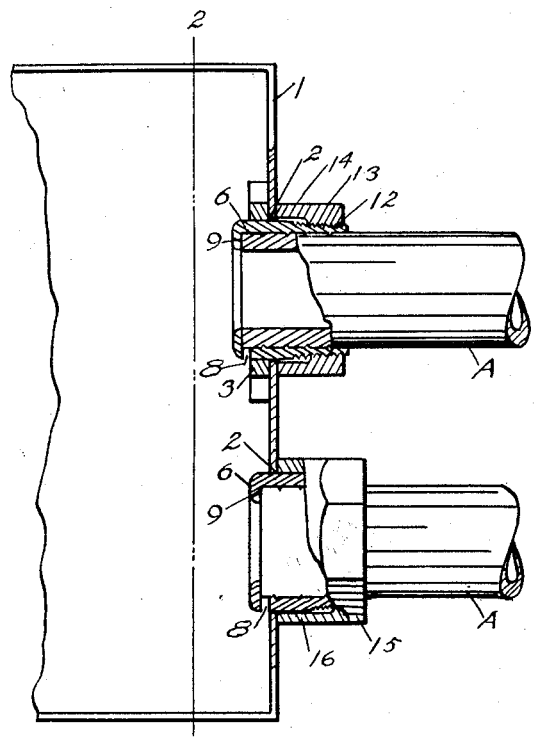
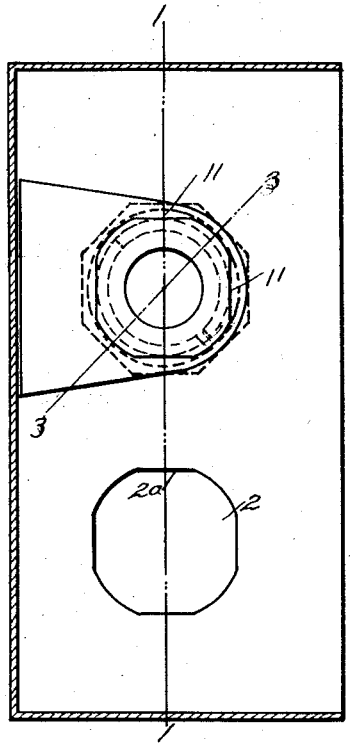
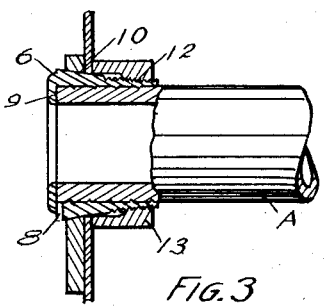
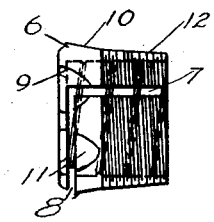
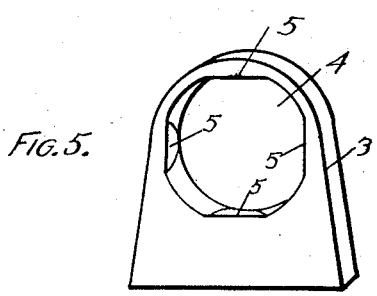
INVENTOR.
Russell P. Dunmire
BY
ATTORNEYS.

Patented May 8, 1928.

1,669,190

UNITED STATES PATENT OFFICE.

RUSSELL P. DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed October 30, 1925. Serial No. 65,824.

This invention is designed to provide means for securing threadless conduits to conduit boxes, commonly called knock-out boxes, that is, boxes having openings with closures such that they may be readily removed by slight force. These boxes are usually of comparatively thin wall and it is desirable to adapt a means of securing a threadless conduit to such wall using a means heretofore designed for use with the ordinary conduit boxes or fittings. Features and details of the invention will appear from the specification and claims.

The invention is illustrated in the accompanying drawings as follows:—

Fig. 1 shows a knock-out box in section on the line 1—1 in Fig. 2.

Fig. 2 a section on the line 2—2 in Fig. 1.

Fig. 3 a section on the line 3—3 in Fig. 2.

Fig. 4 a side elevation of the contractible sleeve.

Fig. 5 a perspective view of the re-enforcing plate.

1 marks the box, 2 the opening in the box, and 3 a reinforcing plate having an opening 4 registering with the opening in the box, this opening having preferably tapered walls and flat portions or portions out of round 5.

The contractible sleeve 6 is one, as before mentioned, heretofore designed for use in ordinary conduit boxes. It has a longitudinal slit 7 opening into a circumferential slit 8 and is provided with a guard 9 at its inner end forming a stop guard for the end of an inserted conduit A. The sleeve has the tapered outer wall 10 with flats, or portions out of round 11 corresponding to the shape of the parts 5. The contractible sleeve is provided with a screw-thread 12 at its outer end.

The contractible sleeve is inserted through a re-enforcing plate through the opening 2. A nut 13 is screwed on to the sleeve. The nut has a spacer 14 as shown integral with the nut and is arranged between the nut and the wall of the box and thus affords a means by which the nut may exert axial movement on the sleeve to draw it into the openings and thus through the wedging action of the tapered portion contract it into clamping engagement with a conduit.

In the lower part of the box I have shown an alternative construction in which the sleeve 6 operates with an opening 2 in the box alone, this opening in the box having flats 2ª for engaging the similar portions of the sleeve. A nut 15 is provided for this sleeve with a spacer 16.

What I claim as new is:—

1. In a conduit fitting, the combination of a conduit box having a conduit opening in its wall; a re-enforcing plate having an opening registering with the opening in the box; a slotted contractible sleeve in the openings in the plate and box having a tapered outer wall adapted to engage the wall of the plate to contract the tapered sleeve upon endwise movement and a screw-threaded outer end; and a nut on the screw-threaded outer end exerting pressure on the wall to move the sleeve to contract the same.

2. In a conduit fitting, the combination of a conduit box having a conduit opening in its wall; a re-enforcing plate having an opening therein in register with the opening in the wall, said plate having a part engaging the wall of the box locking the same against turning relatively to the box and said opening having a portion therein out of round; a slotted contractible sleeve in the opening having a tapered outer wall adapted to engage the wall of the re-enforcing plate to contract the same upon endwise movement and having a portion out of round engaging the out of round portion of the opening in the plate and locking the sleeve against turning, said sleeve having a screw-thread at its outer end; and a nut on the screw thread exerting pressure on the wall of the box to move the sleeve to contract the same through its engagement with the wall of the plate.

In testimony whereof I have hereunto set my hand.

RUSSELL P. DUNMIRE.